United States Patent
Uehara et al.

(10) Patent No.: US 8,868,015 B2
(45) Date of Patent: Oct. 21, 2014

(54) TRANSMIT ARCHITECTURE FOR WIRELESS MULTI-MODE APPLICATIONS

(75) Inventors: Gregory Uehara, Austin, TX (US); Chao Yang, Austin, TX (US); Ruoxin Jiang, Austin, TX (US); Fernando De Bernardinis, Pavia (IT); Alessandro Venca, Tortona (AL); Rinaldo Castello, Arcore (IT); Marc Leroux, Austin, TX (US); Brian Brunn, Austin, TX (US)

(73) Assignee: Marvell World Trade Ltd., St. Michael (BB)

( * ) Notice: Subject to any disclaimer, the term of this patent is extended or adjusted under 35 U.S.C. 154(b) by 238 days.

(21) Appl. No.: 12/782,848

(22) Filed: May 19, 2010

(65) Prior Publication Data

US 2010/0295599 A1 Nov. 25, 2010

Related U.S. Application Data

(60) Provisional application No. 61/179,593, filed on May 19, 2009, provisional application No. 61/179,596, filed on May 19, 2009, provisional application No. 61/181,219, filed on May 26, 2009.

(51) Int. Cl.
*H04B 1/04* (2006.01)
*H04B 1/00* (2006.01)

(52) U.S. Cl.
CPC .................................. *H04B 1/0071* (2013.01)
USPC ....................................... 455/127.4; 455/118

(58) Field of Classification Search
USPC ............................. 455/91–129, 552.1–553.1
See application file for complete search history.

(56) References Cited

U.S. PATENT DOCUMENTS

| | | | |
|---|---|---|---|
| 6,487,398 B1 * | 11/2002 | Nobbe et al. | 455/118 |
| 6,983,135 B1 | 1/2006 | Tsai et al. | |
| 7,138,884 B2 | 11/2006 | Cheung et al. | |
| 7,423,474 B2 * | 9/2008 | Behzad et al. | 327/532 |
| 7,840,191 B2 * | 11/2010 | Mondal | 455/552.1 |
| 8,280,325 B2 * | 10/2012 | Zolfaghari | 455/127.3 |
| 8,346,196 B2 * | 1/2013 | Haralabidis et al. | 455/260 |
| 8,442,581 B2 * | 5/2013 | Chung et al. | 455/552.1 |
| 2002/0145929 A1 | 10/2002 | Ito | |
| 2004/0195917 A1 | 10/2004 | Rogougaran et al. | |
| 2004/0198420 A1 * | 10/2004 | He et al. | 455/553.1 |
| 2008/0125036 A1 | 5/2008 | Konya et al. | |
| 2008/0139132 A1 * | 6/2008 | Pan et al. | 455/93 |
| 2009/0073070 A1 | 3/2009 | Rogougaran | |
| 2010/0077014 A1 * | 3/2010 | Swan | 708/318 |
| 2010/0248660 A1 * | 9/2010 | Bavisi et al. | 455/120 |
| 2013/0331049 A1 * | 12/2013 | Mirzaei et al. | 455/127.2 |

OTHER PUBLICATIONS

International Searching Authority, "International Search Report", Application No. PCT/US2010/035358, Oct. 19, 2010.

* cited by examiner

*Primary Examiner* — Lana N Le

(57) ABSTRACT

In one embodiment, an apparatus includes an upconversion unit configured to upconvert a baseband signal to a radio frequency (RF) signal. A plurality of baluns for a plurality of wireless bands are provided. Multiplexing circuitry is coupled to the plurality of baluns where the upconversion unit is coupled to each balun through the multiplexing circuitry. The multiplexing circuitry is configured to multiplex the radio frequency signal from the upconversion unit to one of the plurality of baluns based on a wireless band being used.

15 Claims, 15 Drawing Sheets

TRANSMIT ARCHITECTURE FOR WIRELESS MULTI-MODE APPLICATIONS

CROSS REFERENCE TO RELATED APPLICATIONS

The present disclosure claims priority to U.S. Provisional App. No. 61/179,593 for "Transmit Architecture for Cellular Multi-Mode Applications" filed May 19, 2009, U.S. Provisional App. No. 61/179,596 for "Transmit Upconversion Circuitry for Cellular Multi-Mode Applications" filed May 19, 2009, and U.S. Provisional App. No. 61/181,219 for "Transmit Upconversion Circuitry for Cellular Multi-Mode Applications" filed May 26, 2009, the contents of which are incorporated herein by reference in their entirety.

BACKGROUND

Particular embodiments generally relate to wireless transmitters.

Unless otherwise indicated herein, the approaches described in this section are not prior art to the claims in this application and are not admitted to be prior art by inclusion in this section.

FIG. 1 depicts a conventional transmitter 100. Differential in phase (I) and quadrature (Q) signals may be processed through separate channels. For example, the I and Q signals are input into digital programmable gain amplifiers (DPGAs) 102a/102b, which amplify the signals. Digital-to-analog converters (DACs) 104a/104b convert the digital I and Q signals to analog. The I and Q signals are then input into low pass filters (LPFs) 106a/106b, which provide attenuation of component noise, quantitization noise, and also provide gain.

Upconverters 108a/108b receive the I and Q signals from low pass filters (LPFs) 106a/106b. Also, a synthesizer 110 generates a local oscillator (LO) signal. Frequency divider/LO generator 112 then generates the I version for the LO signal (LO I) and Q version for the LO signal (LO Q). The LO I signal is sent to upconverter 108a and the LO Q signal is sent to upconverter 108b. Upconverters 108a and 108b upconvert the I and Q signals (at the baseband) to differential radio frequency (RF) signals. The differential RF signals output from upconverter 108a and upconverter 108b are summed through current summing circuitry 114 and converted to a single-ended output through a balun 116.

Balun 116 outputs the RF signal to power amplifier (PA) buffers 118 (or pre-power amplifiers). Each PA buffer 118 may be used for a wireless band, such as second generation (2G) high band (HB), 2G low band (LB), third generation (3G) HB, 3G HB/LB, and 3G LB. PA buffers 118 are used to drive external power amplifiers that are off of an integrated chip (IC). The filtering and linearity that is required by wireless applications is often not sufficiently provided by low pass filters 106.

FIG. 2A depicts a conventional differential PA buffer 118. Upconverters 108a/108b include Gm transistor pairs 202a/202b and mixers 204a/204b, respectively. The baseband I and Q signals are received at Gm transistor pairs 202a and 202b, respectively. Gm transistor pairs 202a/202b convert a voltage to a current.

Mixer 204a and mixer 204b receive the LO I and LO Q signals, respectively, and upconvert the I and Q signals to differential RF signals. The differential RF signals are combined in cascode transistor pair 206. The combined RF signals are then alternating current (AC) coupled through AC coupling capacitors 208a and 208b to PA buffer 118. For example, PA buffer 118 includes a differential pair of transistors 210 and transistors 211a and 211b. PA buffer 118 buffers the signal and outputs a differential signal to balun 116. Balun 116 then outputs the RF signal to a power amplifier at Pout.

FIG. 2B depicts a conventional single-ended PA buffer 118. Gm transistor pairs 202a/202b, mixers 204a/204b, and cascode transistor pair 206 operate similarly as described with respect to FIG. 2A. The differential RF signal from cascode transistor pair 206 is output to balun 116. The single ended output of balun 116 is then AC coupled through an AC coupling capacitor 208 to PA buffer 118. PA buffer 118 includes a first transistor 212a and a second transistor 212b that buffer the signal. A single-ended output is then output to the power amplifier.

In both examples in FIGS. 2A and 2B, PA buffers 118 add noise and distortion, which affects the linearity of the signal.

SUMMARY

In one embodiment, an apparatus includes an upconversion unit configured to upconvert a baseband signal to a radio frequency (RF) signal. A plurality of baluns for a plurality of wireless bands are provided. Multiplexing circuitry is coupled to the plurality of baluns where the upconversion unit is coupled to each balun through the multiplexing circuitry. The multiplexing circuitry is configured to multiplex the radio frequency signal from the upconversion unit to one of the plurality of baluns based on a wireless band being used.

In one embodiment, the multiplexing circuitry comprises a plurality of sets of transistors, wherein each set is associated with a balun in the plurality of baluns.

In one embodiment, the apparatus includes a plurality of upconversion units, wherein each of the plurality of upconversion units is coupled to the plurality of sets of transistors.

In another embodiment, an apparatus comprises: a pole pair of a filter configured to filter a signal, the first pole pair including a first pole and a second pole; a mirror buffer configured to buffer the signal; and a third pole of the filter coupled to the mirror buffer and configured to filter the signal buffered by the mirror buffer.

In one embodiment, the third pole of the filter comprises: a first resistor; a second resistor; a capacitor; and switch circuitry configured to select one of the first resistor or the second resistor.

In one embodiment, the switch circuitry comprises: a first transistor coupled to a first switch; a second transistor coupled to a second switch; wherein when the first switch is closed, the second switch is out of a first signal path coupling the pole pair to the first resistor, wherein when the second switch is closed, the first switch is out of a second signal path coupling the pole pair to the second resistor.

In another embodiment, a method comprises: upconverting a baseband signal to a radio frequency (RF) signal; determining a wireless band in a plurality wireless bands for a multi-mode transmitter; and multiplexing the RF signal to a balun in a plurality of baluns based on a wireless band being used.

The following detailed description and accompanying drawings provide a better understanding of the nature and advantages of the present invention.

DETAILED DESCRIPTION

Described herein are techniques for a wireless transmitter. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
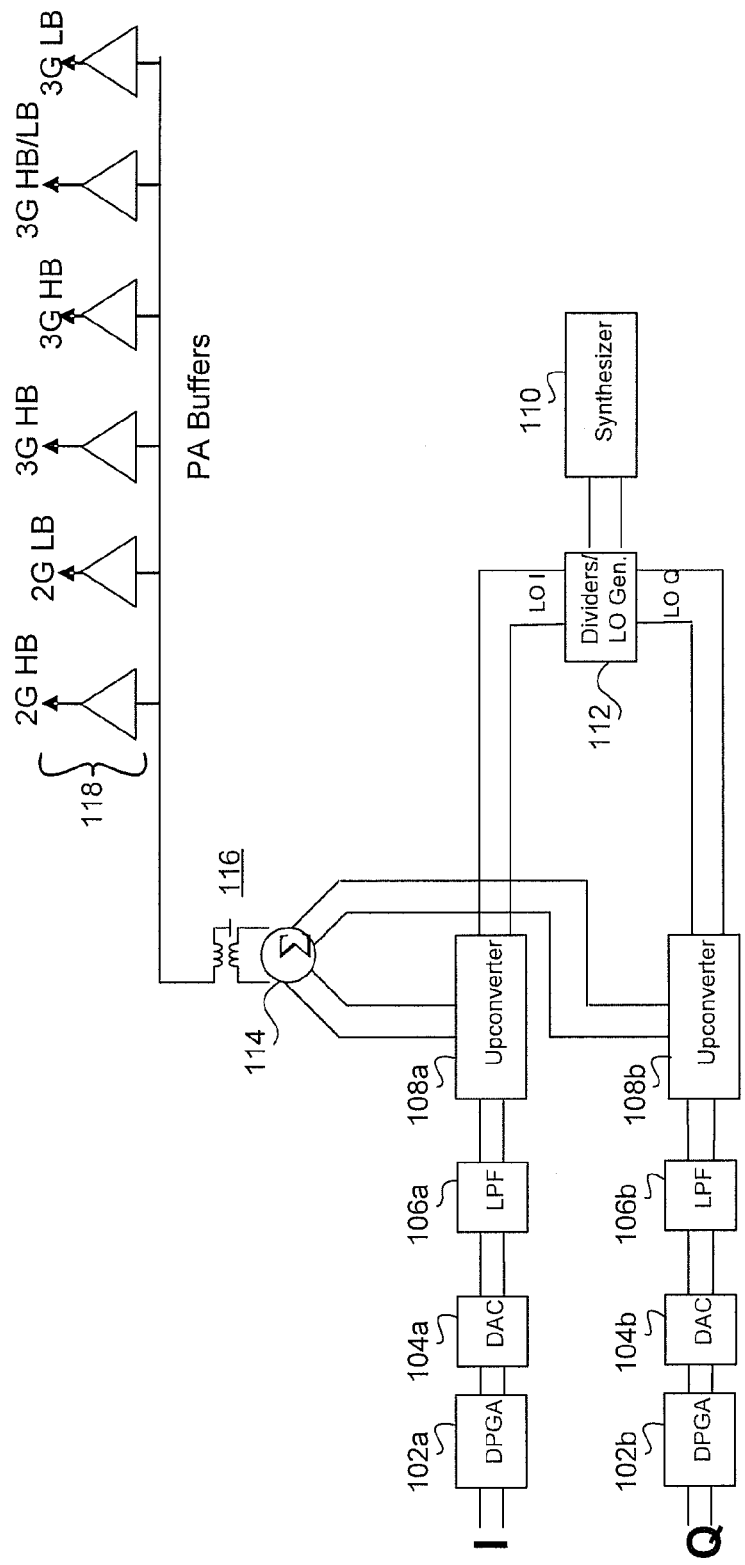
FIG. 1 depicts a conventional transmitter.
Figure 2A:
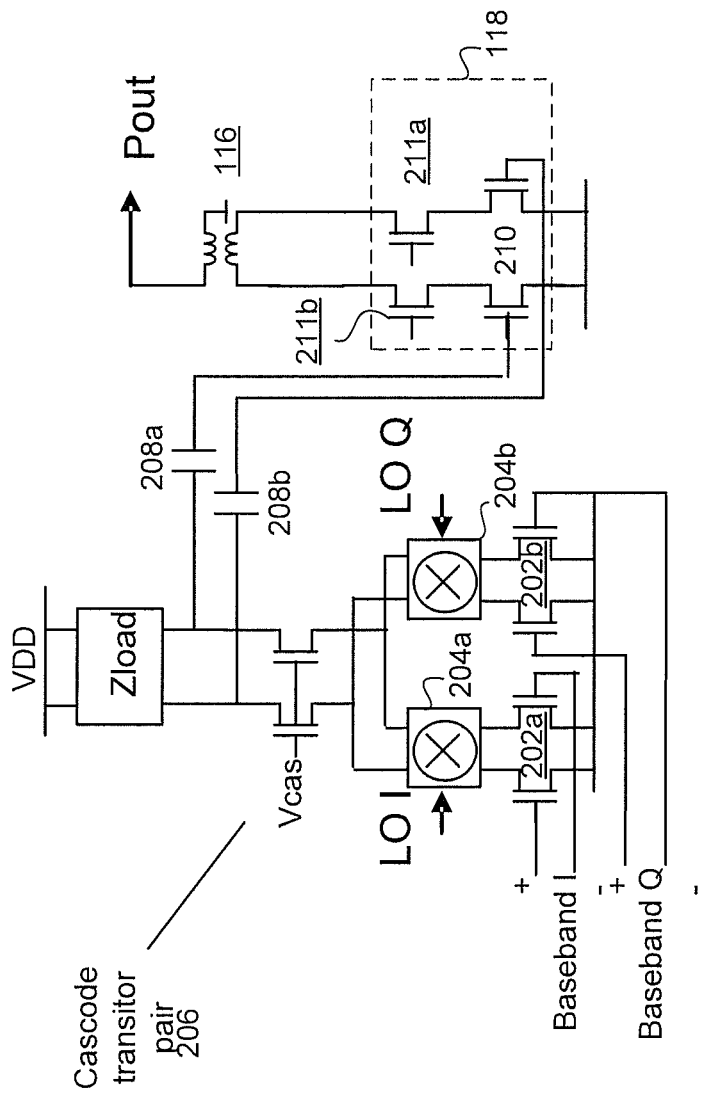
FIG. 2A depicts a conventional differential PA buffer.
Figure 2B:
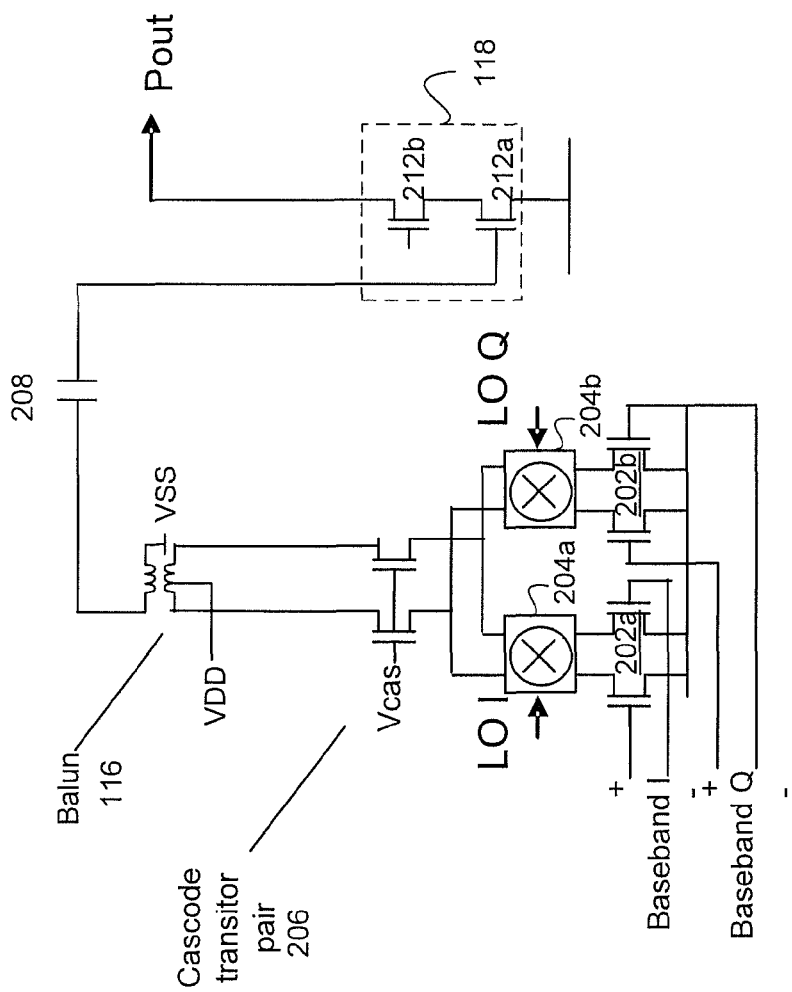
FIG. 2B depicts a conventional single-ended PA buffer.
Figure 3:
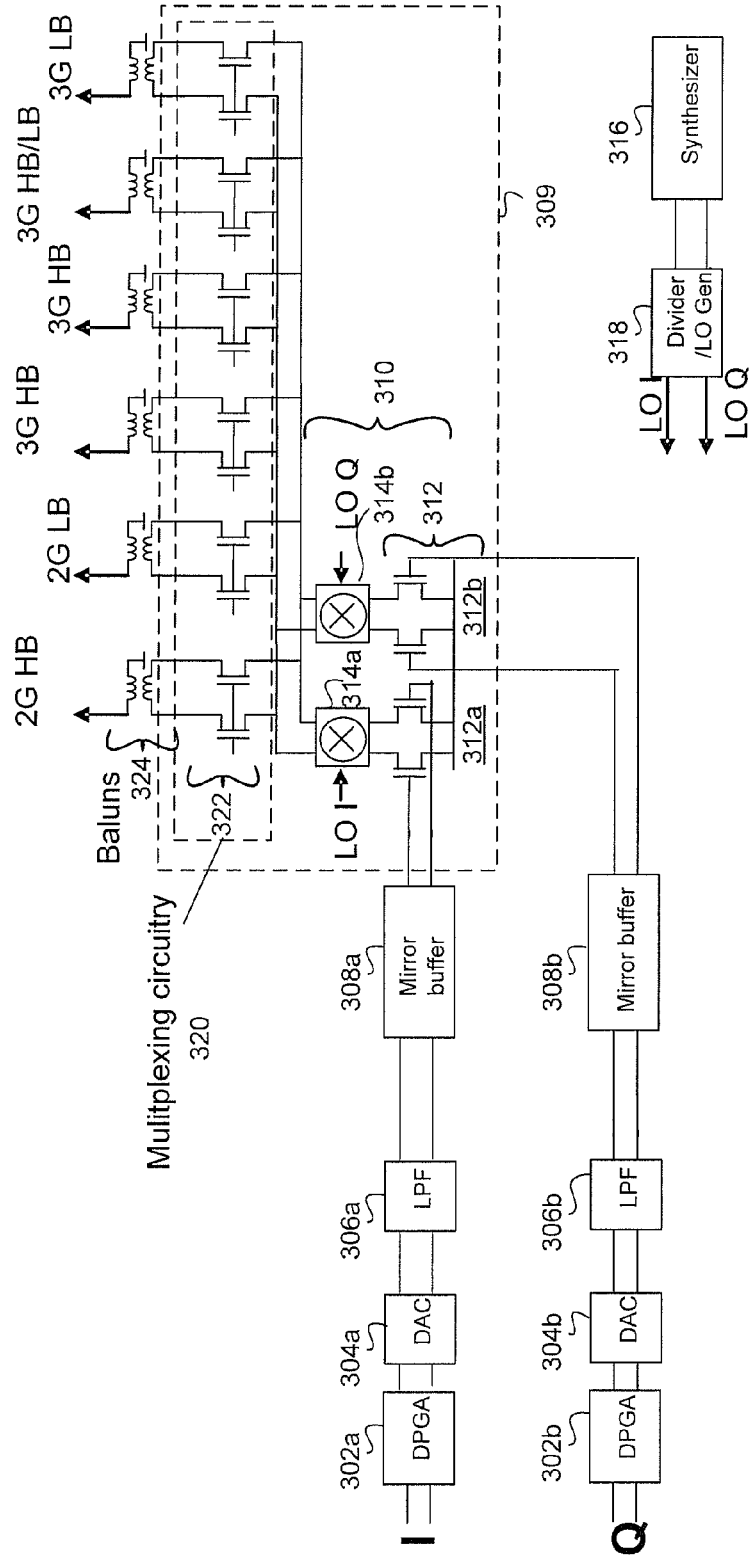
FIG. 3 depicts an example of a transmitter according to one embodiment.

FIG. 3 depicts an example of a transmitter 300 according to one embodiment. Differential in phase (I) and quadrature (Q) signals may be processed through separate channels. The I and Q channels will be described together but follow the paths as shown in FIG. 3. For example, the I and Q signals are amplified in digital programmable gain amplifiers (DPGAs) 302a/302b. Digital-to-analog converters (DACs) 304a/304b convert the digital I and Q signals to analog. The analog I and Q signals are then input into low pass filters (LPFs) 306a/306b. Novel filtering methods will be described in more detail below.

Mirror buffers 308a/308b receive the I and Q signals from low pass filters (LPFs) 306a/306b and mirror the voltage to upconverter 309. Upconverters 309 include up conversion units 310, which include baseband Gm transistor pairs 312a/312b and mixers 314a/314b. Baseband Gm transistor pairs 312a/312b receive the baseband I signal and the baseband Q signal, respectively, and mirror the current from LPFs 306a/306b. For example, baseband Gm transistor pairs 312a/312b convert a voltage from mirror buffers 308a/308b to the current. Also, a synthesizer 316 generates a local oscillator (LO) signal. Frequency divider/LO generator 318 then generates the I version for the LO signal (LO I) and Q version for the LO signal (LO Q). The LO I and LO Q signals may be differential. Mixers 314a and 314b use the LO I signal and the LO Q signal to upconvert the baseband I and Q signals to differential radio frequency (RF) signals.

Multiplexing circuitry 320 is provided to multiplex the RF signal to baluns 324. Cascode multiplexers may be used to multiplex the RF signal. In one embodiment, the cascode multiplexers may be implemented using cascode transistor pairs 322 that sum the current from mixers 314a and 314b. For example, the radio frequency signals from mixers 304a and 304b are combined by cascode transistor pairs 322 into a differential radio frequency signal.

Transmitter 300 may be multimode and can transmit signals using multiple wireless bands. Wireless bands correspond to different wireless standards and transmit RF signals at different frequencies. Baluns 324 are provided for different wireless bands, such as a second generation (2G) high band (HB), a 2G low band (LB), a third generation (3G) HB, a 3G HB/LB, and a 3G LB. A balun 324 is selected based on which wireless band is used. In this example, baluns 324 send a single-ended output to a power amplifier that is off an integrated circuit (IC), but different outputs may be provided. Additionally, baluns 324 may be off chip or in the package of the PA.

Accordingly, transmitter 300 offers a direct up and out approach that does not include a PA buffer. That is, balun 324 directly outputs the RF signal off the chip without going through a PA buffer. Thus, no additional noise and distortion is added from the PA buffer.

The same architecture for transmitter 300 can be used to drive multiple wireless bands. For example, some bands may require differential outputs and some may require single-ended outputs (balanced or unbalanced outputs). In one embodiment, a single-ended output may be converted to multiple differential outputs with a package change. That is, the single-ended output may be converted by changing a ground from a terminal of balun 324 to output a second signal. This outputs differential signals from the two terminals of balun 324. Thus, the same architecture can be configured to drive balanced or unbalanced outputs.

Figure 4A:
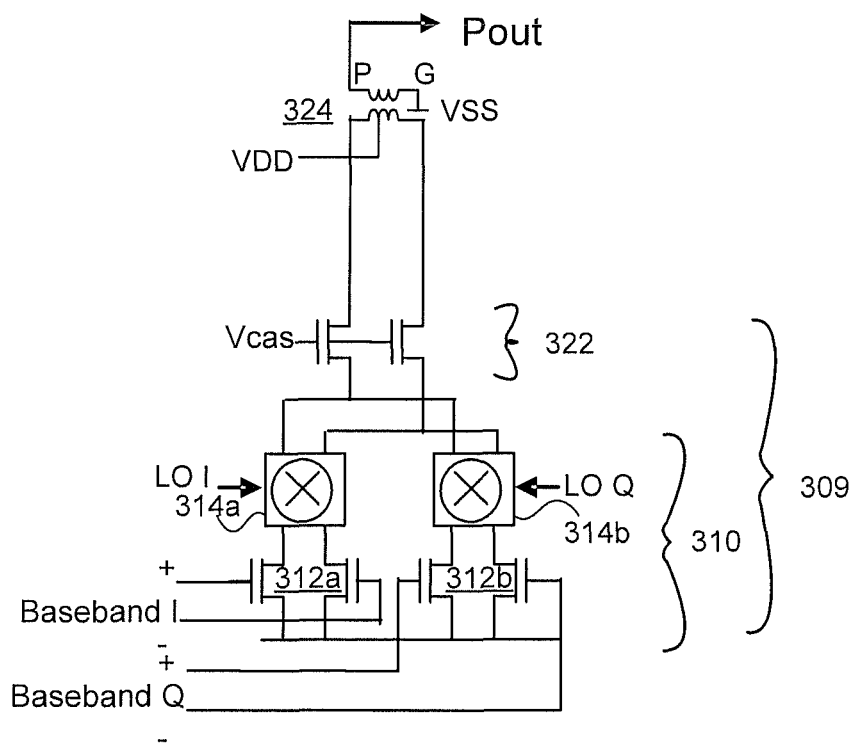
FIG. 4A depicts an example of a single ended output according to one embodiment.

FIG. 4A depicts an example of a single ended output according to one embodiment. The single ended output is simplified by showing only one balun 324 for a wireless band. Similar structures for other wireless bands may be provided. As shown, balun 324 outputs a single ended output (Pout) from a first terminal P. A second terminal G is coupled to ground (VSS).

The input voltage VDD may be approximately 1.8 volts. A maximum output power (Pout) may be met by biasing transistors as follows: baseband Gm transistor pairs 312a/312b are biased in saturation, transistors implemented in mixers 314a/314b are biased in a triode region, and cascode transistor pair 322 are biased in saturation. The 3G wireless band may require a Pout of +6 dBm (50 ohm load) with a 1.8 volt supply. These requirements are met with a better than −38 dBc adjacent channel leakage ratio (ACLR) using the above biasing approach. Conventionally, transistors in mixers 314a/314b are biased in saturation. However, this causes impedance change looking into cascode transistor pair 322, which affects the linearity of the signal. By biasing mixer transistors in the triode region, the impedance change is minimal and linearity is minimally affected.

Figure 4B:
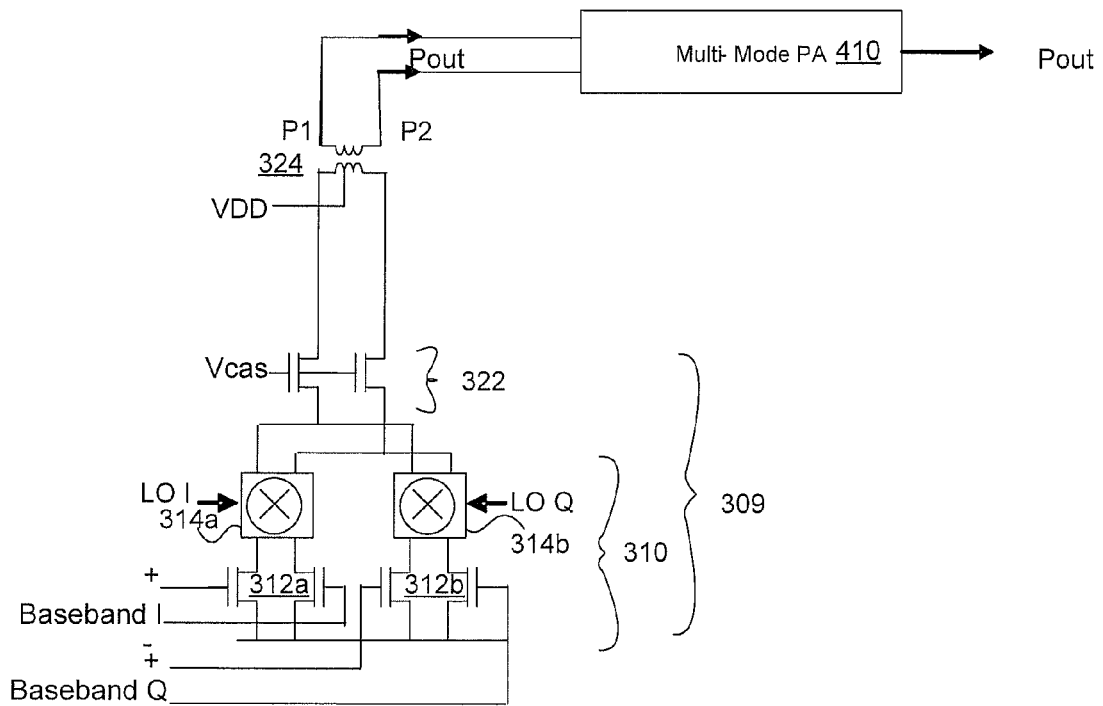
FIG. 4B shows an example of a differential output according to one embodiment.

FIG. 4B shows an example of a differential output according to one embodiment. As shown, balun 324 provides a differential output at a first terminal P1 and a second terminal P2. Instead of having terminal P2 coupled to ground, terminal P2 outputs a signal that may be a complementary signal of a signal output from terminal P1. The differential output is used to drive a multi-mode power amplifier 410, which is off chip. As discussed above, the differential signal does not go through a PA buffer when sent from balun 324 to power amplifier 410.

Figure 4C:
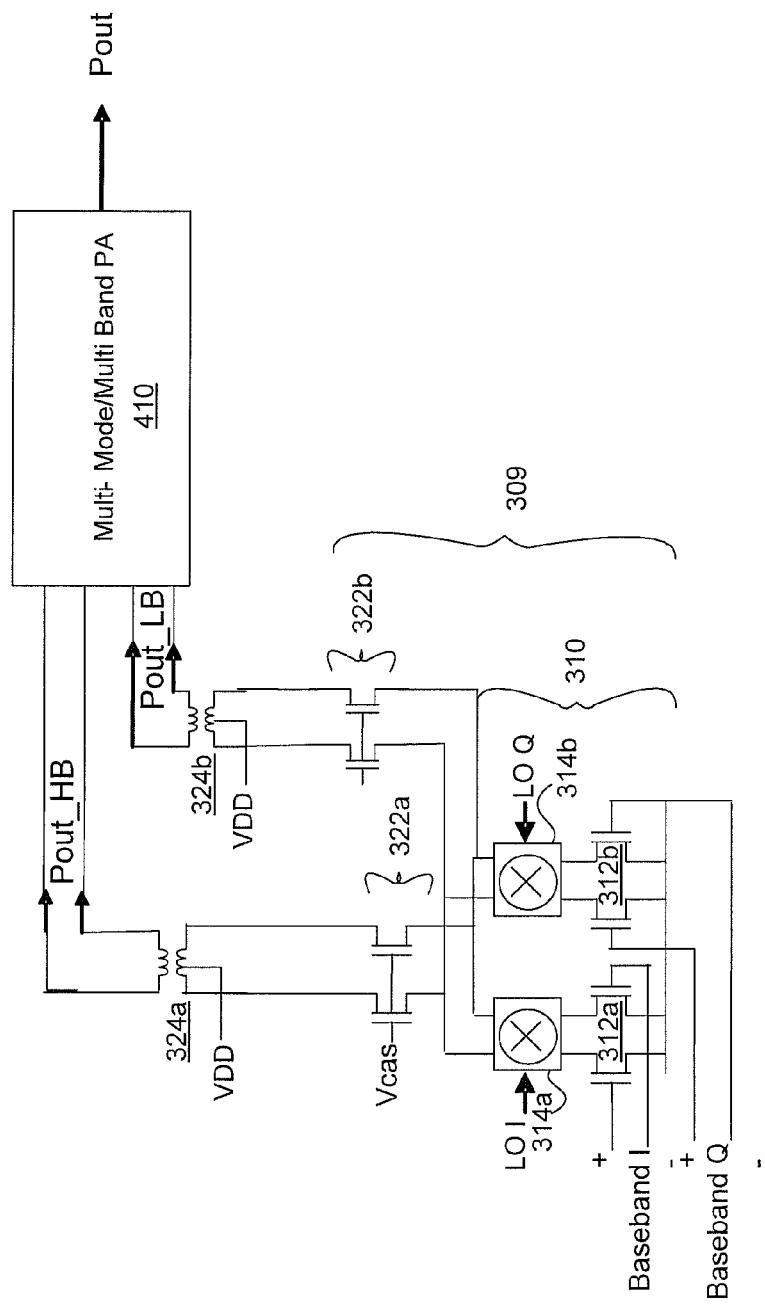
FIG. 4C shows another example of the transmitter for driving multiple wireless bands according to one embodiment.

FIG. 4C shows another example of transmitter 300 for driving multiple wireless bands according to one embodiment. A first balun 324a provides a differential output signal Pout_HB for a highband wireless band and a second balun 324b provides a differential output signal Pout_LB for a lowband wireless band. A multi-mode/multi-band power amplifier (PA) 410 receives the signals Pout_HB and Pout_LB.

Figure 5:
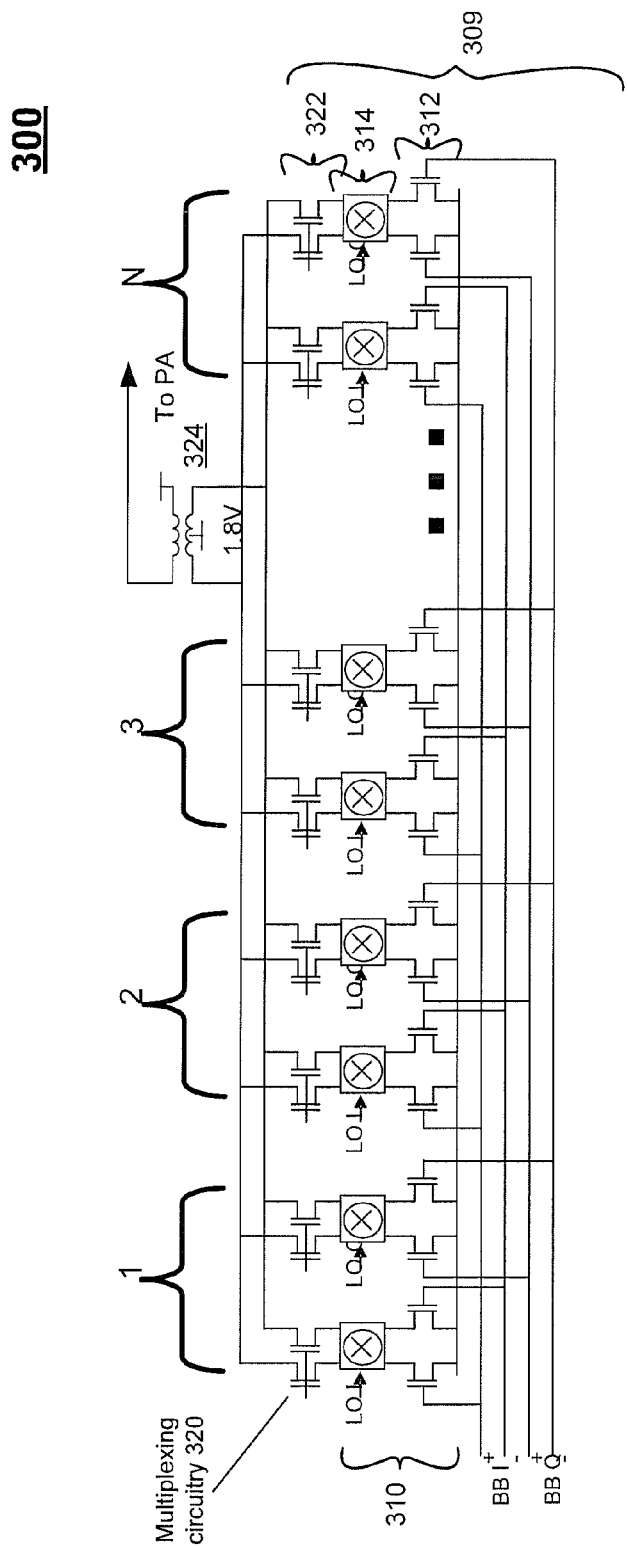
FIG. 5 depicts an example of the transmitter for providing reduced power according to one embodiment.

In one embodiment, the power used by transmitter 300 may be reduced. FIG. 5 depicts an example of transmitter 300 for providing reduced power according to one embodiment. As shown, a plurality of upconverters 309 are provided in parallel. Each upconverter 309 includes an upconversion unit 310 and multiplexing circuitry 320 represented by cascode transistor pairs 322.

N wireless bands are provided that can output a signal to one or more power amplifiers. For example, N PAs may be provided for N wireless bands. Although not shown for N wireless bands, a balun 324 is provided for each wireless band and sends the RF signal to a power amplifier for that wireless band. Each upconverter 309 is coupled to a balun 324 for each wireless band. For example, cascode transistor pairs 322 are coupled in parallel to each balun 324.

To reduce power, upconverters 309 may be turned off. For example, cascode transistor pairs 322 may be turned off by biasing the gates of cascode transistor pairs 322 with a voltage to turn them off. This also reduces the current used by transmitter 300 because current does not flow through cascode transistor pairs 322 when they are turned off Thus, the current and power may be reduced by turning off a percentage of upconverters 309. For example, if half of cascode transistor pairs 322 are turned off for half of upconverters 309, then the power and current may be reduced by half.

Figure 6:
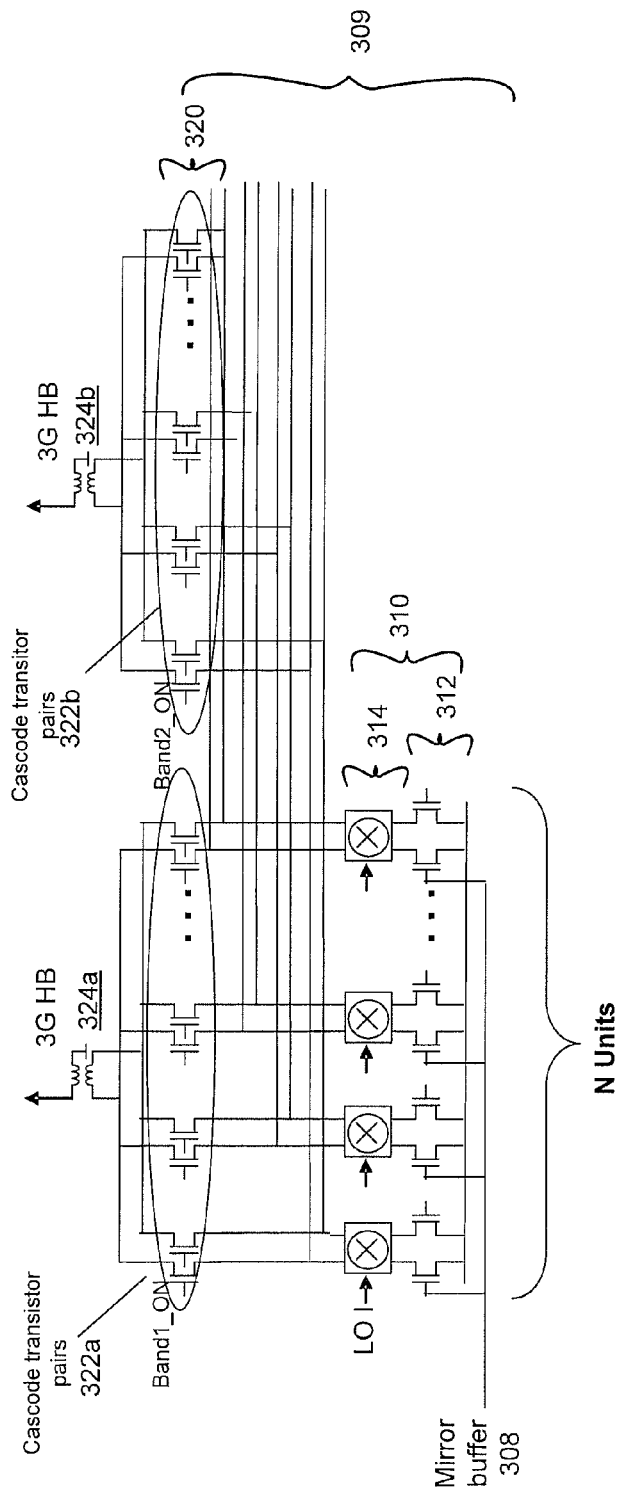
FIG. 6 depicts an example of the transmitter for providing multiplexing according to one embodiment.

In addition to being able to reduce power, multiplexing circuitry 320 may also be used to couple upconversion units 310 to different wireless bands. For example, FIG. 6 depicts an example of transmitter 300 for providing multiplexing according to one embodiment. An N number of upconversion units 310 are provided. For example, 80 upconversion units 310 may be provided. Upconversion units 310 receive I and Q signals, upconvert the I and Q signals to RF signals, and then output the RF signals to multiplexing circuitry 320. The implementation shown in FIG. 6 is shown for a single mixer 314a. Similar circuitry may be used for mixer 314b and combined with the implementation shown in FIG. 6.

Multiplexing circuitry 320 is configured to couple upconversion units 310 to the wireless bands that are supported by transmitter 300. For example, seven wireless bands as described above may be supported. Each wireless band includes a balun 324 that is used to output the RF signal to a power amplifier. As shown, a band #1 for 3G HB and a band #2 for 3G HB are provided. Although these two bands are shown, other wireless bands may be provided.

Multiplexing circuitry 320 may include sets of cascode multiplexers, which multiplex the RF signal from mixers 314 among baluns 324. In one embodiment, cascode transistor pairs 322 are used to couple upconversion unit 310 to baluns 324. Although cascode transistor pairs 322 are described, other implementations may be used. In one example, the number of sets of cascode transistor pairs 322 may be N*X, where N is the number of upconversion units and X is the number of outputs. For example, if there are seven outputs, then seven sets of 80 cascode transistor pairs 322 are provided for a total of 560 cascode transistor pairs 322. Thus, each output includes a set of 80 cascode transistor pairs 322.

When a wireless band is selected, the set of cascode transistor pairs 322 associated with that wireless band are turned on and cascode transistor pairs 322 for the other wireless bands are turned off. For example, if band #1 is used, a bias voltage Band1_ON at the gates of cascode transistor pairs 322a is biased such that cascode transistor pairs 322a turn on. Also, a bias voltage Band2_ON is biased at the gates of cascode transistor pairs 322b such that the set of cascode transistor pairs 322b for wireless band #2 are turned off. This couples upconversion units 310 to balun 324a through cascode transistor pairs 322a. Also, since cascode transistor pairs 322b are off, upconversion units 310 are not coupled to balun 324b. Conversely, when wireless band #2 is used, then the bias voltage Band2_ON is biased such that cascode transistor pairs 322b are turned on while the bias voltage Band1_ON is biased such that cascode transistor pairs 322a are turned off. This couples upconversion units 310 to balun 324b and not balun 324a. Accordingly, multiplexing is provided by biasing different sets of cascode transistor pairs 322 to turn on one set and turn the other sets off.

Figure 7:
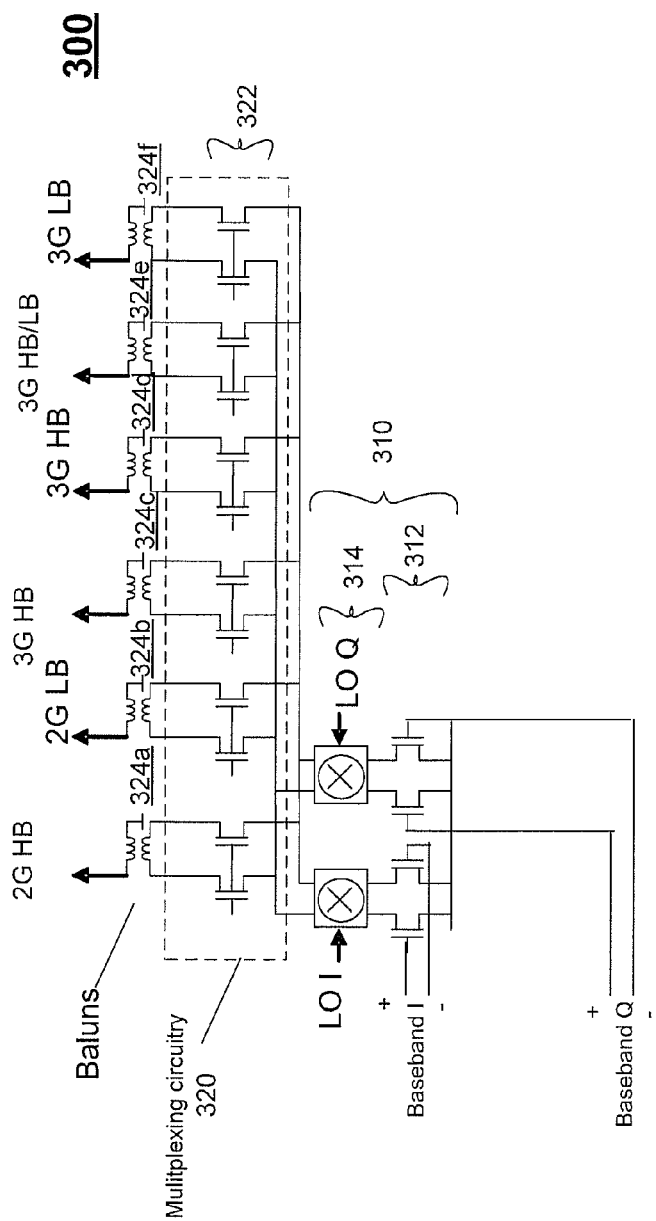
FIG. 7 shows an example of the transmitter of FIG. 6 showing multiple wireless bands according to one embodiment.

FIG. 7 shows an example of transmitter 300 of FIG. 6 showing multiple wireless bands according to one embodiment. In the example, a single upconversion unit 310 for the I channel and Q channel is shown. Multiple upconversion units 310 may be connected in parallel, but are not shown.

Upconversion unit 310 is coupled to multiplexing circuitry 320. A simplified schematic of multiplexing circuitry 320 is provided in that all cascade transistor pairs 322 in a set for a balun 324 are not shown. In the simplified schematic, cascode transistor pairs 322 couple upconversion unit 310 to baluns 324a-324f. The six output baluns 324 each provide a signal for a different wireless band to a power amplifier. A seventh output (not shown) may be coupled to resistors and to the supply voltage VDD for offset and gain calibration. Multiplexing circuitry 320 multiplexes the RF signal from upconversion unit 310 to balun 324 based on which wireless band is selected. For example, if a wireless band 3G HB is selected, then upconversion unit 310 is coupled to balun 324d through cascode transistor pairs 322 for balun 324d.

Figure 8A:
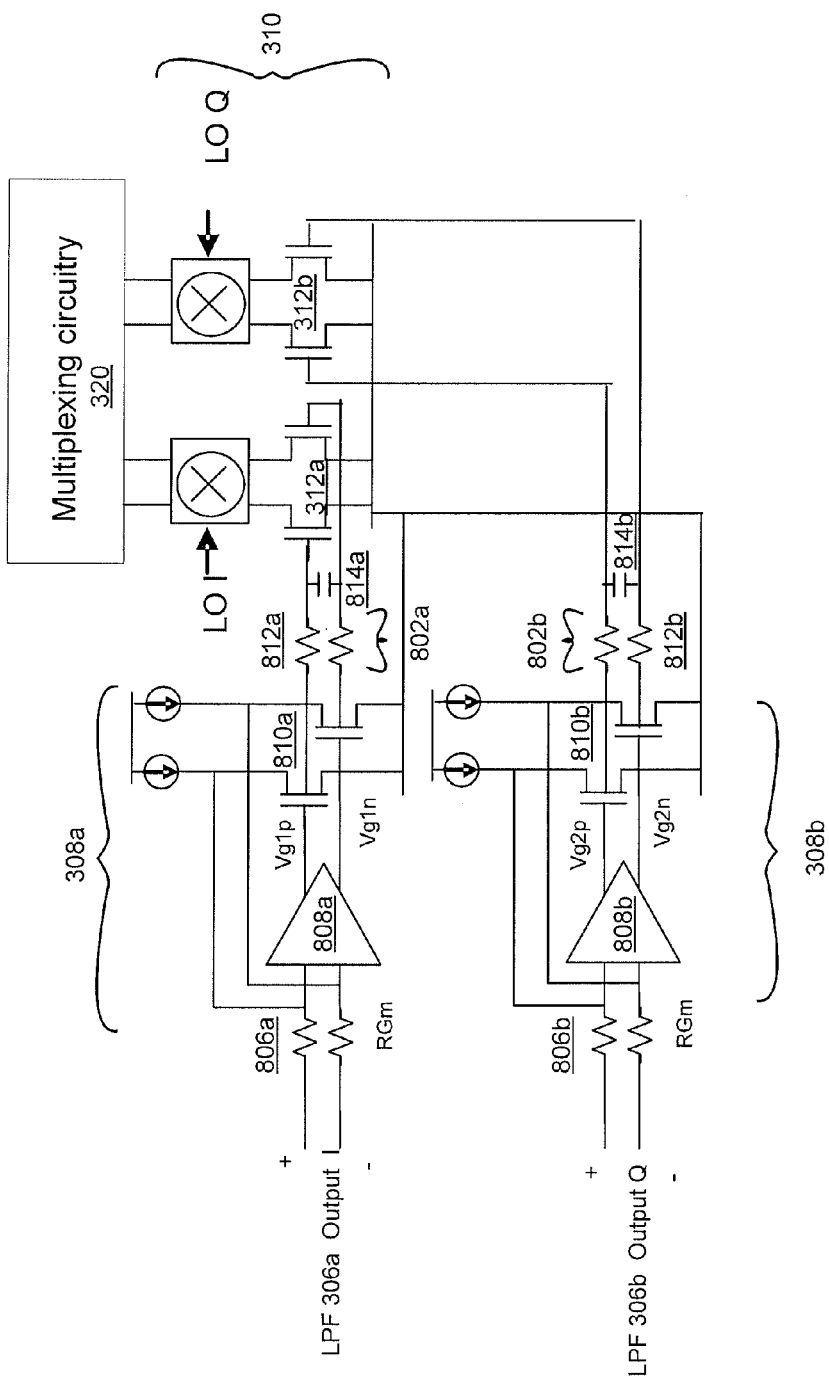
FIG. 8A depicts an example of the transmitter showing a filter according to one embodiment.

A filter may be inserted in between mirror buffer 308 and upconversion units 310 to provide filtering of I and Q signals. FIG. 8A depicts an example of transmitter 300 showing filters 802a/802b according to one embodiment. Filters 802a and 802b are provided in between mirror buffers 308a/308b and upconversion unit 310. Filters 802a/802b include resistors 812a/802b and capacitors 814a/814b, respectively. FIG. 8 is a simplified view of one upconversion unit 310. However, other upconversion units may be provided in parallel.

Filters 802a/802b provide filtering of noise from low pass filter 306 and also from mirror buffer 308. For example, signals Vg1p and Vg1n for the I channel are filtered by filter 802a and filtering of signals Vg2p and Vg2n for the Q channel are filtered through filter 802b. For both the I and Q signals, the outputs of low pass filters 306a/306b are converted to a current using resistors 806a/806b (RGm). Resistors 806a/806b are at virtual ground due to the negative feedback from the drains of transistors 810a/810b, respectively, and convert a voltage from the output of low pass filters 306a/306b to a current.

The current is then input into differential op amps 808a and 808b, respectively. Transistors 810a and 810b are coupled to the output of op amps 808a/808b, respectively, and have their gates modulated by signals Vg1p/Vg1n and Vg2p/Vg2n, respectively, at a voltage that creates a drain current equal to the current flowing through each of resistors 806a/806b. The signals Vg1p and Vg1n pass through filter 802a and then modulate the gate of Gm transistor pairs 312a. The signals Vg2p and Vg2n pass through filter 802b and then modulate the gates of Gm transistor pairs 312b. This creates an AC current proportional to the output voltage from low pass filters 306a/306b at the drains of Gm transistor pair pairs 312a/312b, respectively.

Figure 8B:
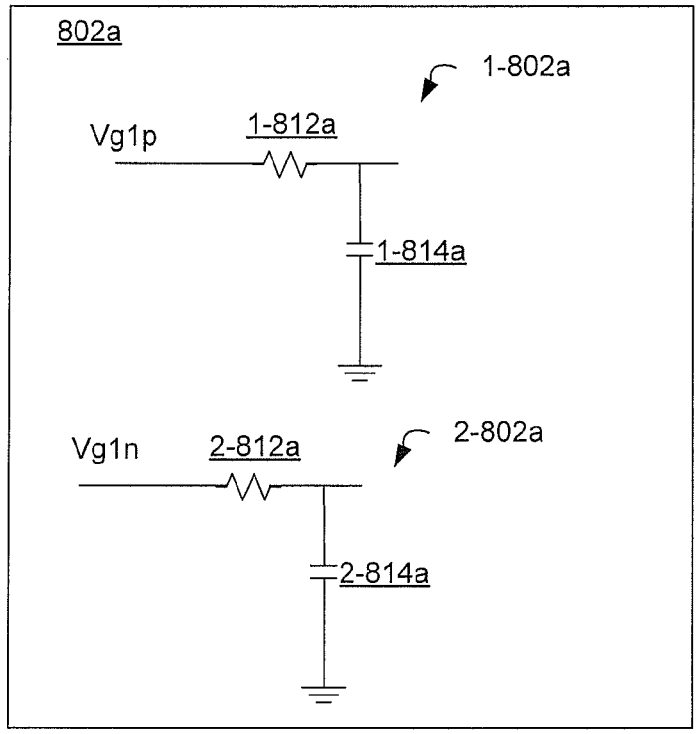
FIG. 8B shows an example of the filter according to one embodiment.

Filters 802a/802b may be implemented differently as shown in FIG. 8A. For example, FIG. 8B shows an example of filter 802a according to one embodiment. Filter 802b may be similarly implemented. A first filter 1-802a is coupled to receive the signal Vg1p and includes a resistor 1-812a and a capacitor 1-814a. Capacitor 1-814a is coupled to ground. The output of filter 1-802a is coupled to a first transistor of Gm transistor pair 312a.

A filter 2-802a receives the signal Vg1n. A resistor 2-812a and capacitor 2-814a are provided. Capacitor 2-814a is coupled to ground. The output of filter 2-802a is coupled to a second transistor of Gm transistor pair 312a. Filters 1-802a and 2-802a may be used in lieu of filter 802 shown in FIG. 8A.

Figure 8C:
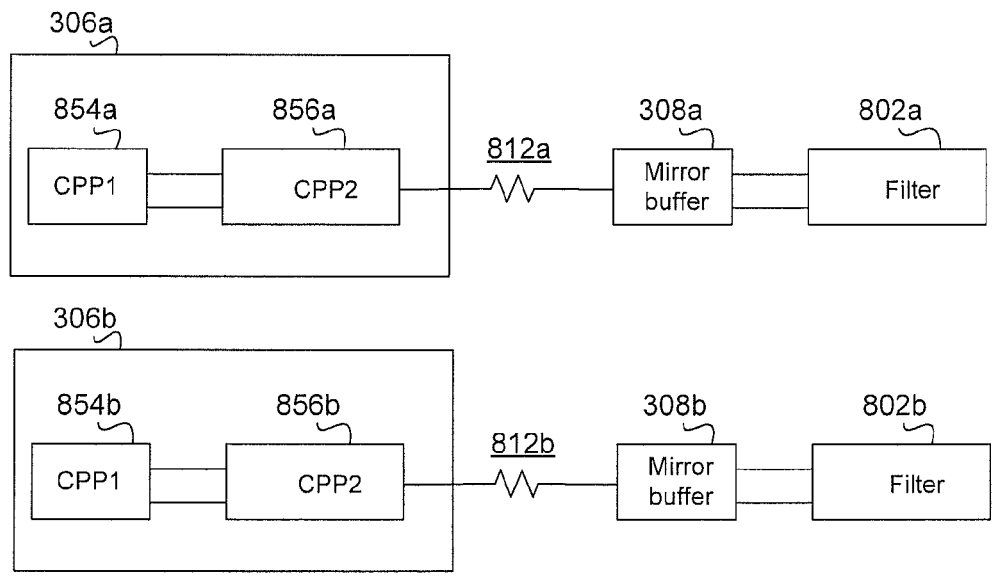
FIG. 8C depicts an example of the low pass filters and filters according to one embodiment.

Referring back to FIG. 8A, filters 802a/802b may be part of an nth order filter when combined with low pass filter 306. For example, low pass filter 306 and filter 802 may be part of a third or fifth order filter. FIG. 8C depicts an example of low pass filters 306a/306b and filters 802a/802b according to one embodiment.

Low pass filters 306a/306b may be implemented as one or two complex pole pairs (CPPs). As shown, two CPPs 854a/854b and 856a/856b are provided in this example. The poles of the filter may be determined based on the transfer function of the filter. In one embodiment, a Butterworth filter is implemented using low pass filter 306 and filter 802; however, other filters may be used.

CPPs 1 provide filtering of noise introduced by DACs 304a/304b, respectively. CPPs 2 also provide filtering of noise introduced by DACs 304a/304b and CPP 1. Filters 802a/802b provide filtering of noise introduced by CPP2 and also mirror buffers 308a/308b, respectively.

Filters 802a/802b may be the fifth pole of a $5^{th}$ order filter, which implements a fifth order response filter, or the third pole of a $3^{rd}$ order filter, which implements a third order response filter. Filters 802a/802b may be referred to as a Tx pole. Although a third or fifth order filter is described, an Nth order filter may also be used. Because filters 802a/802b are in a signal path with CPP1 and CPP2, respectively, filters 802a/802b are a real pole in the higher order filter. In one embodiment, the Tx pole is placed at a frequency high enough away from the band edge of the baseband spectrum so that linearity is minimally impacted but meaningful filtering of noise contributions of noise is provided. For example, if baseband signal is at 2 MHz, the Tx pole may be placed around 4 MHz or 2 times the frequency of the baseband signal.

Figure 9:
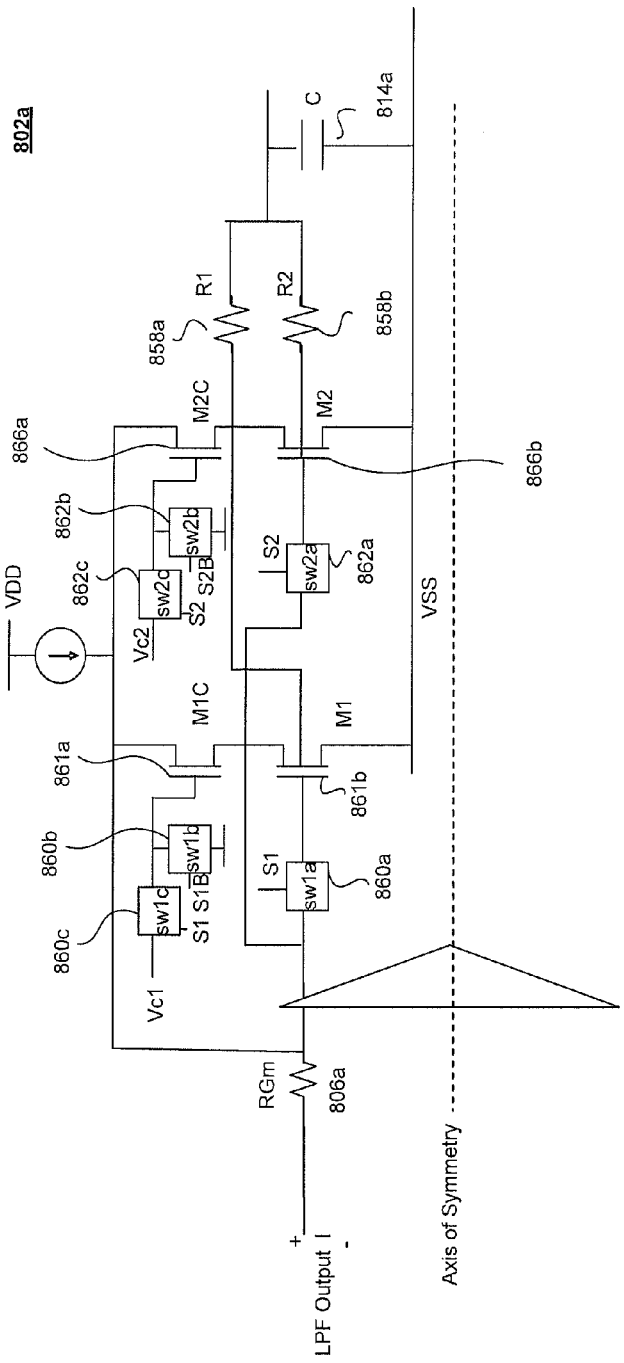
FIG. 9 depicts a more detailed example of the filter according to one embodiment.

Filter 802 may be programmable. FIG. 9 depicts a more detailed example of filter 802a according to one embodiment. Only one branch of the I signal processing channel is shown as noted by the axis of symmetry. Other branches of the I channel and the Q channel operate similarly. Filter 802a is programmable in that a first resistor 858a or a second resistor 858b may be coupled to the output of low pass filter 306a. Additional resistors 858 may also be used.

Filter 802a provides programmability and also limits distortion. For example, switch resistance may cause the nonlinearity. The distortion is limited because switches for resistor 858a are not in the signal path when resistor 858b is selected and switches for resistor 858b are not in the signal path when resistor 858a is selected.

When resistor R1 is desired for the Tx pole, the voltage S1 is high (e.g., 1) and the voltage S1B is low (e.g., 0). This closes a switch (sw1a) 860a, which couples a transistor (M1) 861b to the LPF output through resistor 806a and turns transistor M1 on. The voltage S1B opens a switch (sw1b) 860b.

Also, a switch (sw1c) 860c is closed because the voltage S1 is high. This couples the voltage Vc1 to the gate of a transistor (M1C) 861a and biases transistor M1C in the saturation region (the biasing can also be the triode region) such that transistor M1C is turned on. Also, the voltage S2 is low (e.g., 0) then the voltage S2b is high (e.g., 1). This opens a switch (sw2a) 862a and closes a switch (sw2b) 862b. Also, S2 is low and a switch 862c is open. This couples a transistor (M2C) 866a to ground (VSS) and transistor M2C is not on.

The above puts transistor M1 and transistor M1C in a feedback loop and selects resistor R1 for the loop filter resistor. The switch non-linearity of switch sw1a is in the feedback loop and the feedback loop compensates for any non-linearity caused by the switch. Also, because switch 862a is open, the gate of a transistor 866b (M2) is floating. Thus, resistor R2 is out of the circuit. Further, the signal path from transistor M1 to the output of filter 802a does not include any switches and thus results in a highly linear signal.

When resistor (R2) 858b is selected, the voltage S1 is low and the voltage S1b is high. This couples the gate of transistor M1C to ground and thus it is not turned on. Switch 860a is also opened such that transistor M1 is not coupled to the low pass filter output.

The voltage S2 is high and the voltage S2b is low. This closes switch 862a and biases a transistor (M2) 866b to turn on. Also, transistor M2C is coupled to the voltage Vc2 and is biased to turn on. This provides a signal path that selects resistor R2. The signal path from transistor M2 to the output of filter 802a does not include a switch and thus results in a highly linear signal. Thus, a highly linear programmable filter is provided.

Figure 10:
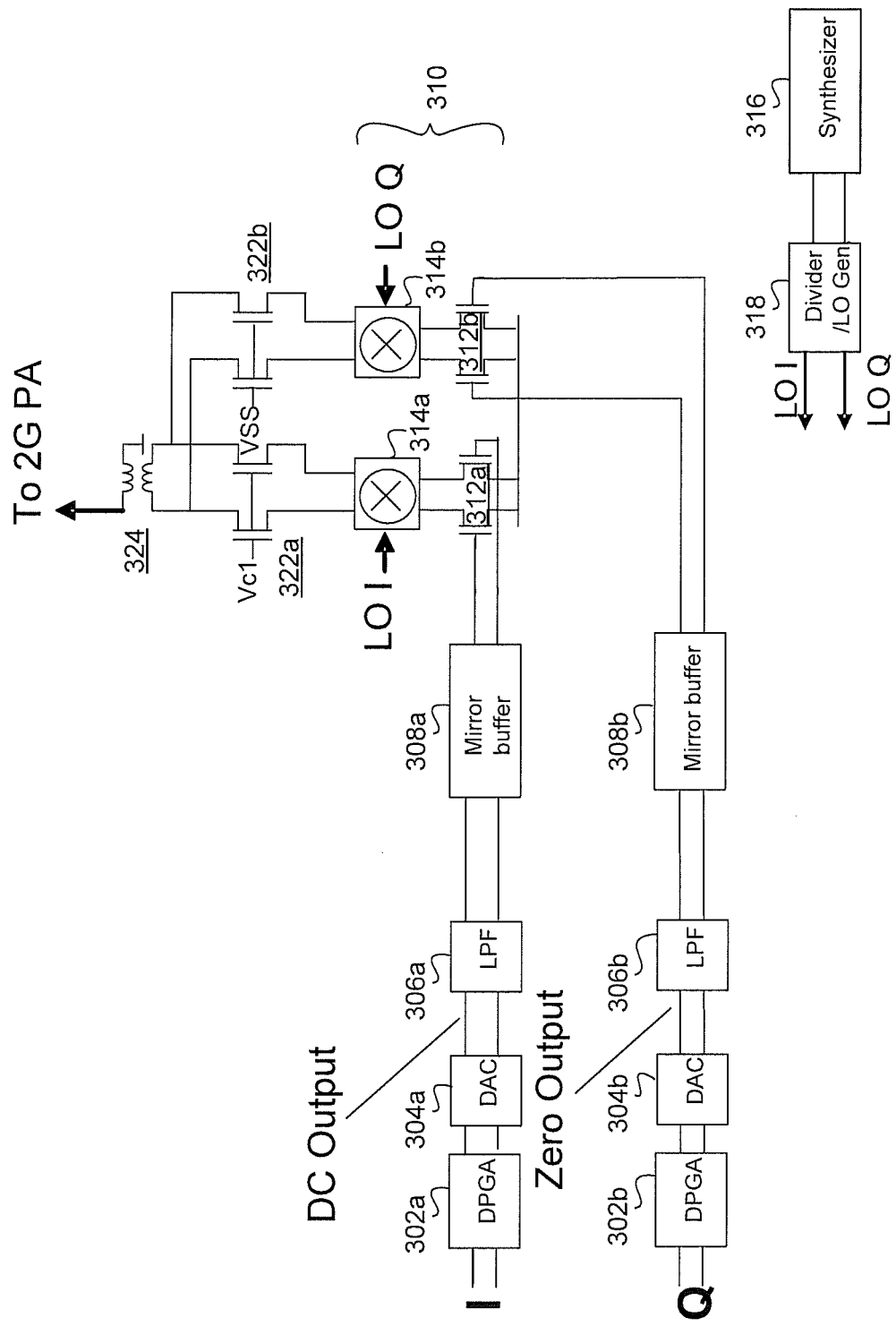
FIG. 10 depicts an example of the transmitter for the 2G wireless band according to one embodiment.

Transmitter 300 may also be used to support the 2G wireless band. FIG. 10 depicts an example of transmitter 300 for the 2G wireless band according to one embodiment. The 2G band may use only the I channel. Thus, the operation of transmitter 300 may be altered to not use the Q channel. A direct current (DC) output is output by DAC 304a in the I channel. A zero output is output in the Q channel from DAC 304b. DACs 304a and 304b may be programmed to output the DC output and the zero output.

Synthesizer 316 generates a Gaussian minimum shift keying (GMSK) signal. The GMSK signal is used to upconvert the I signal to a 2G radio frequency signal. Frequency divider/LO generator 318 generates the LO I and LO Q modulating signals. The I signal in the I channel is mixed with the LO I signal at mixer 314a. The Q channel has been disabled with the zero output and the LO Q signal is then output by mixer 314b. However, cascode transistor pairs 322b are disabled by biasing their gates to VSS. Thus, this channel is off or disconnected from balun 324. Mixer 314a upconverts the I signal to an RF signal using the GMSK LO I signal. The gates of cascode transistor pairs 322a are biased with a voltage Vc1 that biases the transistors in the saturation region to turn the transistors on. Thus, the RF signal output by mixer 314a is sent to balun 324.

Accordingly, the same I channel and Q channel path may be used for the 2G and 3G wireless bands. However, as discussed with respect to FIG. 10, the 2G band uses the DC output applied to the I channel and the Q channel is turned off. When a wireless band that requires both channels is being used, such as 3G, both channels may be enabled.

Figure 11:
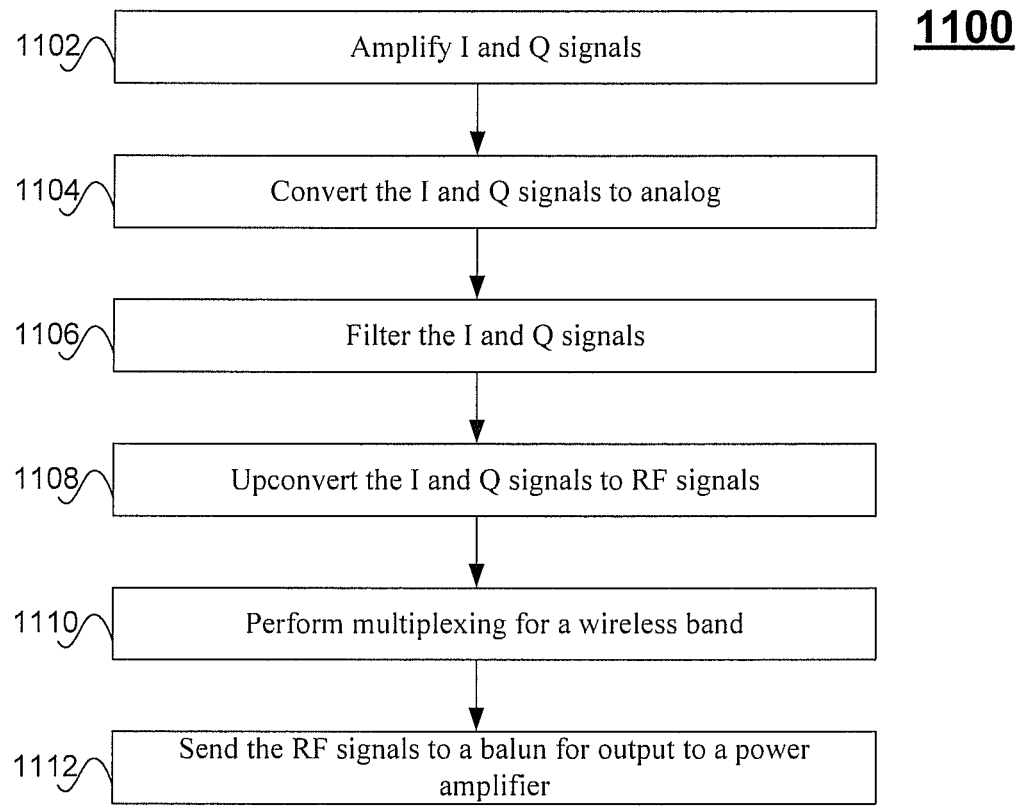
FIG. 11 depicts a method for transmitting a signal according to one embodiment.

FIG. 11 depicts a method for transmitting a signal according to one embodiment. At 1102, I and Q signals are amplified. At 1104, the I and Q signals are converted to analog I and Q signals. At 1106, filtering is applied to the I and Q signals.

At 1108, the I and Q signals are upconverted to RF signals. At 1110, multiplexing for a wireless band is performed. At 1112, the RF signals are sent to a balun 324 for output to a power amplifier.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. An apparatus comprising:
   a plurality of upconversion units configured to upconvert a baseband signal to a first plurality of radio frequency (RF) signals;
   a plurality of baluns corresponding to a plurality of wireless bands; and
   multiplexing circuitry coupled to the plurality of baluns;
   wherein:
      the plurality of upconversion units are coupled to each balun through the multiplexing circuitry, and
      the multiplexing circuitry is configured to multiplex a second plurality of RF signals, selected from the first plurality of RF signals, to one of the plurality of baluns based on a wireless band being used.

2. The apparatus of claim 1, wherein the multiplexing circuitry comprises a plurality of sets of transistors, wherein each set is associated with a balun in the plurality of baluns.

3. The apparatus of claim 2, wherein each of the plurality of upconversion units is coupled to the plurality of sets of transistors.

4. The apparatus of claim 3, wherein, through the multiplexing circuitry, one set of transistors is coupled to one of the plurality of baluns to send at least one of the second plurality of RF signals from at least one of the upconversion units through the one of the plurality of baluns.

5. The apparatus of claim 4, wherein the one set of transistors is coupled to the one of the plurality of baluns by biasing the one set of transistors to be on and biasing the other sets of transistors to be off.

6. The apparatus of claim 1, wherein each of the plurality of upconversion units comprises:
   a Gm transistor biased in a saturation region; and
   a mixer transistor biased in a triode region,
   wherein the multiplexing circuitry comprises a multiplexing transistor biased in the saturation region.

7. The apparatus of claim 1, wherein the one of the plurality of baluns comprises a differential output or a single-ended output.

8. The apparatus of claim 1, further comprising:
   a filter; and
   a mirror buffer,
   wherein a pole of the filter is coupled in between the mirror buffer and at least one of the plurality of upconversion units.

9. The apparatus of claim 8, wherein the filter comprises a pair of transmitter poles coupled to an input of the mirror buffer.

10. The apparatus of claim 1, wherein each of the plurality of upconversion units comprises:
    a first mixer configured to mix an in phase (I) signal with a first local oscillator signal to generate a first radio frequency signal; and
    a second mixer configured to mix a quadrature (Q) signal with a second local oscillator signal to generate a second radio frequency signal,
    wherein the multiplexing circuitry is configured to couple the first mixer to the one of the baluns and not couple the second mixer to the one of the baluns.

11. A method comprising:
    upconverting a baseband signal to a first plurality of radio frequency (RF) signals using a plurality of upconversion units;
    determining a wireless band in a plurality of wireless bands for a multimode transmitter, wherein the multimode transmitter comprises a plurality of baluns corresponding to the plurality of wireless bands; and
    multiplexing a second plurality of RF signals, selected from the first plurality of RF signals, to a balun in the plurality of baluns based on a wireless band being used.

12. The method of claim 11, wherein the multiplexing comprises coupling the second plurality of RF signals through a set of transistors in a plurality of sets of transistors, wherein each set of transistors is associated with one balun in the plurality of baluns.

13. The method of claim 12, wherein coupling comprises biasing the one set of transistors to be on and biasing the other sets of transistors to be off.

14. The method of claim 11, further comprising:
    filtering the baseband signal using a first filter;
    buffering the baseband signal using a mirror circuit; and
    filtering the baseband signal from the mirror circuit using a second filter.

15. The method of claim 14, wherein the first filter and the second filter form an Nth order filter.

* * * * *